United States Patent [19]
Frank et al.

[11] 3,812,725
[45] May 28, 1974

[54] BALANCING APPARATUS

[75] Inventors: Helmut Frank, Dieburg; Otfrid Maus, Darmstadt-Arheilgen; Endre Tary, Darmstadt, all of Germany

[73] Assignee: Carl Schenck Maschinenfabrik GmbH, Darmstadt, Germany

[22] Filed: Mar. 12, 1973

[21] Appl. No.: 340,078

[30] Foreign Application Priority Data
Mar. 28, 1972 Germany............................ 2215002

[52] U.S. Cl.................................. 73/462, 73/471
[51] Int. Cl. ............................................ G01m 1/22
[58] Field of Search ............ 73/459, 460, 462, 471, 73/11, 465

[56] References Cited
UNITED STATES PATENTS
2,131,602   9/1938   Thearle................................ 73/462

FOREIGN PATENTS OR APPLICATIONS
1,233,097   5/1971   Great Britain ........................ 73/471

*Primary Examiner*—James J. Gill
*Attorney, Agent, or Firm*—W. G. Fasse; W. W. Roberts

[57] ABSTRACT

A dynamic mass balancing machine includes a flexibly supported motor drive shaft bearing assembly which is coupled to two motion sensor-transducers. The points of coupling are in a mutual vertical plane which is coplanar with the axis of rotation and the plane of displacement of the spring supported bearing assembly of the machine. The vertical coupling points of the sensor-transducers are located so that independent measurement of unbalances in two different planes will be achieved.

11 Claims, 6 Drawing Figures

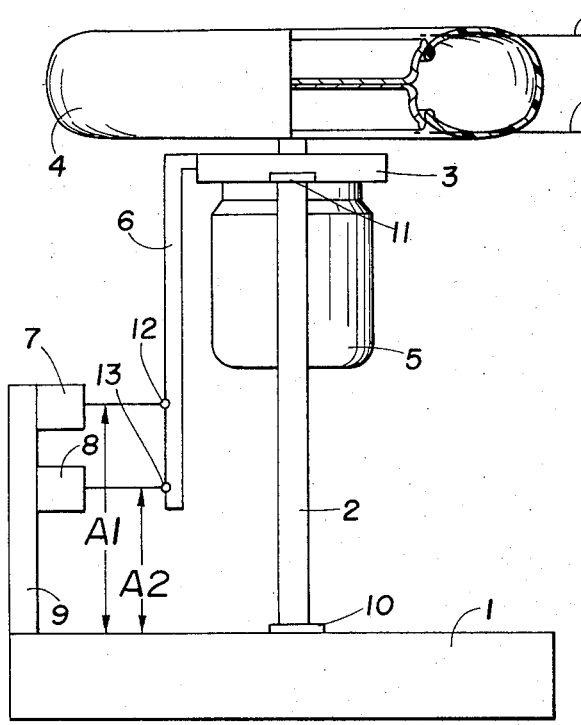
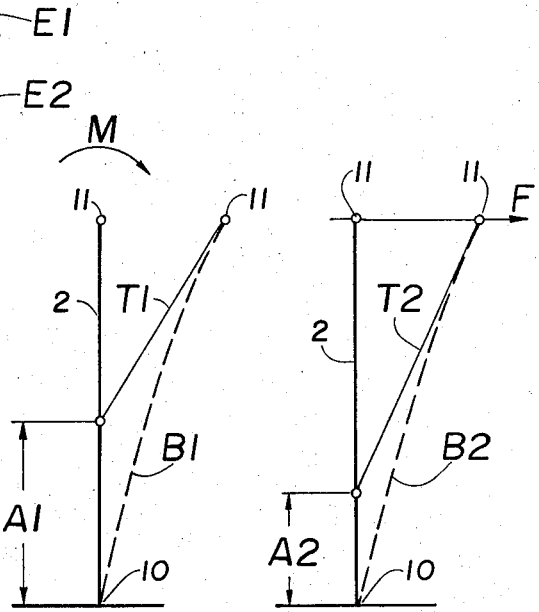
FIG. 1  FIG. 2a  FIG. 2b
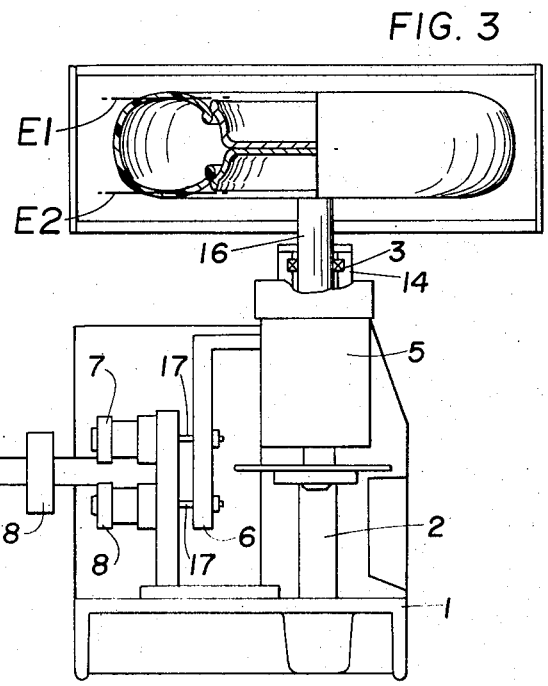
FIG. 3

BALANCING APPARATUS

BACKGROUND OF THE INVENTION

The present invention relates to a balancing apparatus which is tuned subcritically for balancing a body to be balanced, hereafter referred to as a test piece, in at least two planes, wherein the bearing means for the test piece is elastically supported by spring means, and wherein two measuring or sensing transducers are rigidly supported in the apparatus.

In a known mass balancing machine of the type here considered as disclosed in German Auslegeschrift No. 1,698,164, two pairs of leaf springs are positioned so that one pair of parallel springs supports the axis of rotation of the test item free of constraint in one direction. The other pair of springs is supported by the first pair, the individual leaves being arranged at an angle with respect to each other so that their imaginary lines of extension intersect at the level of one of the balance planes. In this arrangement at least four leaf springs are required. The effective lines of action of the two displacement sensors are at a 90° angle with respect to each other. This arrangement necessates the use of of a phase shifter. Since a phase shifter is a frequency dependent element, it must be individually calibrated for different rotational speeds.

OBJECT OF THE INVENTION

It is therefore the object of the present invention to provide a balancing apparatus that overcomes the above disadvantages of the prior art, and which simplifies the electromechanical complexity of the machine either singly or in combination by reducing the number of spring elements required or eliminating the need for a phase shifter.

SUMMARY OF THE INVENTION

Briefly stated, according to the invention, at least one spring is rigidly clamped at one end in a stationary position and also clamped at the other end, i.e., at the supporting structure of the bearings for the test piece to be balanced. A rigid extension arm is attached to this structure, the extension arm being coupled to the two sensor-transducers so that the coupling point for one of the transducers is located at the point of intersection of the tangents at each clamping point to the bending line of the spring which results from an unbalance moment, and the coupling point of the other sensor-transducer being located at a different point.

BRIEF FIGURE DESCRIPTION

In order that the invention may be clearly understood, it will now be described, by way of example, with reference to the accompanying drawings, wherein:

FIG. 1 is a simplified schematic representation of a mass balancing machine according to the invention;

FIGS. 2a and 2b illustrate diagrammatically the procedure for determining the two coupling points for the sensor-transducers according to the invention;

FIG. 3 is a sectional view of one embodiment of a mass balancing machine according to the invention;

DETAILED DESCRIPTION OF EXAMPLE EMBODIMENTS

Figure 4:
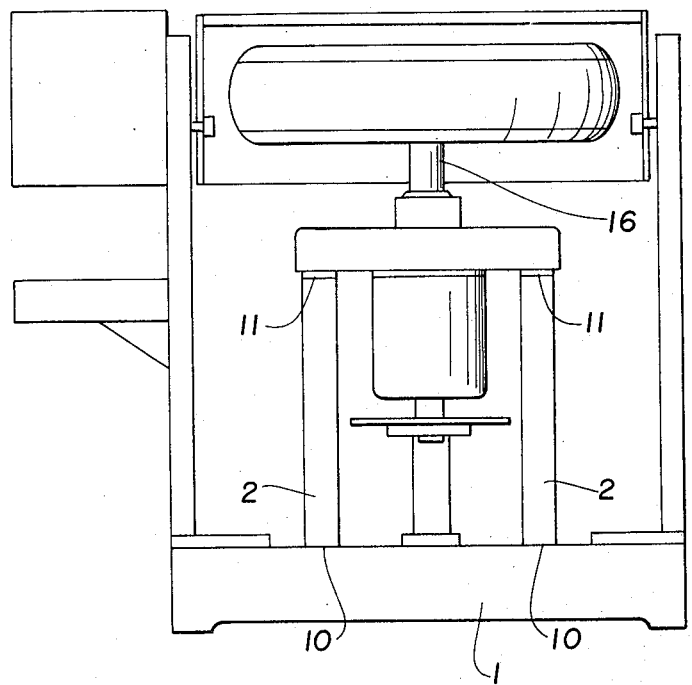
FIG. 4 is a sectional view of the machine of FIG. 3 along line IV—IV.

Referring now to FIG. 1, a test piece 4 to be balanced, such as an automotive tire and wheel, is supported above a bearing assembly 3. The bearing assembly 3 is supported above a base 1 by means of a spring 2. $E_1$ and $E_2$ are the planes in which unbalances in the test piece are to be compensated. A drive motor 5 is attached to the bearing assembly 3 for rotating the test piece. A bracket arm 6, to which two sensor transducers 7 and 8 are coupled, is rigidly attached to the bearing assembly 3. An upright post 9 is rigidly attached to the base 1 and the two sensor-transducers 7 and 8 are mounted on the post 9. The spring 2 is rigidly mounted on the base 1 at the clamping point 10, the effective clamping point for simplicity's sake being assumed to be identical with the base top surface. The upper end of the spring is rigidly clamped to the bearing assembly 3, the effective clamping point for simplicity's sake being assumed to be identical with the top surface of the bearing assembly 3.

Both the distance $A_1$ between the coupling point 12 of the sensor-transducer 7 and the clamping point 10 of the spring, i.e., the top of the base 1, and the distance $A_2$ between the coupling point 13 of the sensor-tranducer 8 on the bracket arm 6, as measured from the effective spring clamping point 10, i.e., the top surface of the base 1, are determined by the procedure as illustrated in FIGS. 2a and 2b.

As shown in FIG. 2a an imbalance moment M acting on the spring 2 at the upper clamping point 11 produces a bending line $B_1$. The tangent $T_1$ to the bending line $B_1$ at the upper end of the spring 2 intersects the centerline of the undeflected spring, which is identical with the tangent to the bending line at the base clamping point 10, at a point which determines the distance $A_1$ of the coupling point 12 from the top of the base 1. The tangent $T_1$ corresponds to the bearing axis rigidly clamped with respect to the top of the spring.

A horizontal unbalance force F acting on the spring 2 at the upper clamping point 11 produces the bending line $B_2$. The tangent $T_2$ to the bending line $B_2$ at the upper end of the spring 2 intersects the centerline of the undeflected spring, which is identical with the tangent to the bending line at the base clamping point 10, at a point which determines the distance $A_2$ for the second coupling point 13 from the top of the base 1 (FIG. 2b). The tangent $T_2$ corresponds to the bearing axis rigidly clamped with respect to the top of the spring for horizontal forces.

The sensor-transducer 7, coupled to the arm 6 at the distance $A_1$, expieriences no displacement in the case of a pure moment lead (FIG. 2a), and the sensor-trasnducer 8, coupled to the arm 6 at the distance $A_2$, experiences no displacement in the case of a pure horizontal or lateral force (FIG. 2b).

A dynamic unbalance, as the term is employed herein, induces a pure unbalance moment at the bearing support of the test piece, causing a bending deflection of the supporting spring. The intersection of the two tangents to the bending line at the two clamped ends of the supporting spring determines the coupling point for one of the two sensor-transducers with respect to the stationary clamping point. At this coupling point no lateral displacement will be produced as a result of a dynamic unbalance, thus registering only the effect of a unbalance force. The other sensor-transducer, which is not located at this point, may thus register both force and moment unbalances.

In order to measure the dynamic unbalance with the least possible interference due to any residual static unbalance in accordance with the invention at least one bending spring is mounted parallel to the axis of rotation and is rigidly clamped at the stationary end as well as at the bearing housing structure. The housing also provides for the attachment of a rigid arm to which the two sensor-transducers are coupled. As above discussed, one of the coupling points is determined by the intersection of the tangents at the clamping points to the bending line produced by a dynamic unbalance, and the coupling point for the other sensor-transducer is determined by the intersection of the tangents at the clamping points to a bending line produced by the unbalance effect in a given or fixed measuring plane.

The static unbalance effect, as the term is employed herein, produces a lateral force at the bearing assembly, thereby deflecting the supporting spring. The intersection of the two tangents to the bending line at the bearing assembly and at the stationary clamping point, respectively, determines the coupling point for the other sensor-transducer. Since this coupling point does not experience a lateral displacement due to an unbalance in the given or fixed measuring plane, the respective sensor-transducer will register only the effects of an unbalance in the other plane, i.e., one of the sensor-transducers receives a signal proportional to the static unbalance, namely the vectorial sum of the two individual unbalances, while the other sensor-transducer receives a signal due to the dynamic effect of the unbalance in the other plane.

By allowing for the distance between the two planes the latter effect can be made directly proportional to the second unbalance, so that the difference between the two signals is proportional to the first unbalance.

Quantitative information about the magnitude of the unbalance in both planes may be obtained without a great deal of transformation from the signals registered by the two sensor-transducers in one single test run. The angular location (or phase angle) of the respective unbalances may be determined by well known means, e.g., with the aid of a stroboscope or other instrument which indicates the phase angle of the respective unbalances.

If the balancing plane is different from the fixed measuring plane, the static part of the unbalance in the two planes causes an additional moment with respect to the fixed plane. In order to compensate for this effect, in accordance with the invention, compensating voltages are added to the output voltages of the sensor-transducers, the quantitative magnitude of which depends upon the distance of one of the balance planes from the fixed plane. The compensating voltages are tapped from the output voltage of the respective other transducers. As a result of this moment compensation the signal obtained from one of the transducers is again proportional to the static unbalance while that from the other transducers is proportional to the dynamic unbalance, i.e., to the effect of the unbalance in the second plane. For practical purposes the two transducers are mounted coplanar with the axis of rotation of the test piece. The spring is flexible in this plane but inflexible normal thereto. The flexible bearing support of the test piece is thereby restricted to movement in one plane only. The particular advantage of this arrangement is that no undesirable phase difference exists between the outputs of the two transducers.

Figure 5:
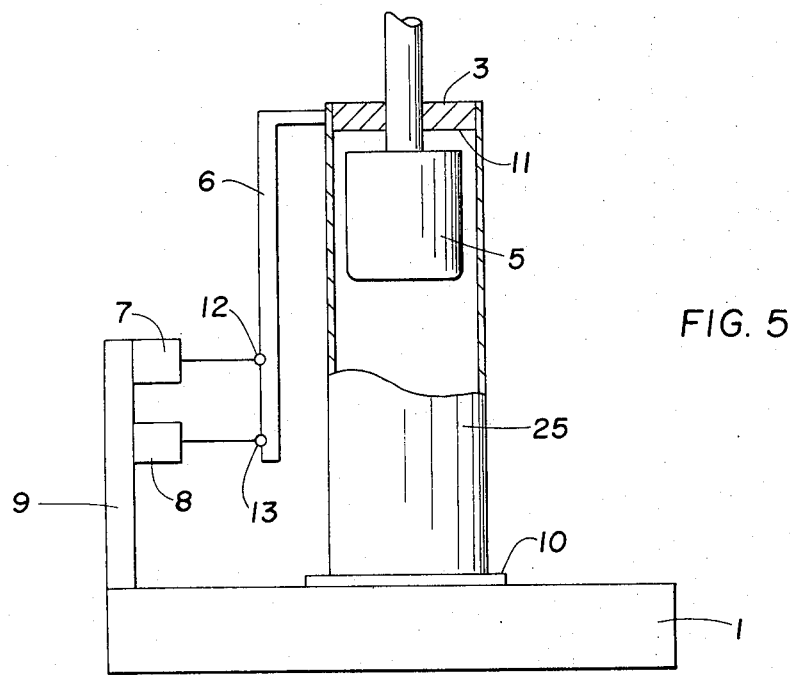
FIG. 5 is a simplified schematic representation of a further embodiment of the invention.

The spring may consist of a single leaf with nonuniform cross-section over its entire length; however, as an alternative, several parallel leaves may be used, which may support the bearing assembly of the test piece and also the drive motor between them. The spring element may also consist of two parallel flexible bars placed such that they are in a plane which, as a preferred arrangement, are coplanar with the axis of rotation and normal to the plane of the transducers. In this arrangement, with no elaborate construction involved, a bearing support is obtained which is flexible in one direction and inflexible in the direction normal thereto, and with ample space for the drive motor between the two bars. The danger of buckling is especially small in this construction, thus permitting, in addition to supporting the weight of the motor and the bearing assembly, the testing of especially heavy test pieces. A particularly advantageous realization of this construction, as shown in FIG. 5, is provided by providing the spring element in the form of a tube 25 containing the bearing assembly and/or the drive motor, the tube thus simultaneously serving as a machine housing extending coaxially with the axis of rotation.

It is preferred that the spring has a uniform cross section over its entire effective length so that the coupling point of one sensor-transducer is at the midpoint of the effective spring length and the coupling point of the other sensor-transducer is at one third of the effective spring length from the stationary clamping point. In general, the effective spring length is different from the distance between the two clamping points, i.e., it is equal to the distance between effective clamping points.

While the arrangement according to the invention preferably employs one or more leaf springs, it is contemplated that the springs may be in the form of torsion springs or a combination of torsion and leaf springs.

Since the bearing assembly of the balancing machine, as provided for according to the invention, occupies only a small space, the balance test piece is easily accessible from all sides. The sensor-transducers may be relative or absolute measuring devices.

In the embodiment of the invention illustrated in FIGS. 3 and 4, the bearing assembly 3 for the test piece is supported on a platform 14. The motor 5 for rotating the test piece is suspended from the platform, and the platform is bolted to the upper ends by two spring bars 2. The lower ends of the bars 2 are screwed into the base 1. The distance between the spring bars is sufficient to accommodate the drive motor between them. The spring bars 2 and the axis of rotation 16 of the test piece lie in a common plane, which is perpendicular to a plane defined by the axis of rotation 16 and the two sensor-transducers 7 and 8.

The sensor-transducers 7 and 8 are vibration transducers which may consist of displacement, velocity or acceleration measuring elements. The sensor-transducers are employed as relative pickups and are coupled by means of separate flexible couplings 17 to the arm 6. The arm 6 is rigidly bolted to the motor housing. The upright post 9, upon which the two transducers 7 and 8 are mounted, is bolted to the machine base 1.

The outputs of the two transducers 7 and 8 are applied to a transformation circuit 18, which combines the outputs of the transducers and provides compensating voltages as above discussed. A switch 19 permits selection between the planes $E_1$ and $E_2$. The electrical signal from the circuit 18 is transmitted to a filtered amplifier 20 by way of the switch 19 and hence to an indicator 21. The indicator may be directly scaled to provide an unbalance reading for each plane.

In the illustrated example of the balancing of an automobile wheel neither of the two compensation planes $E_1$ and $E_2$ is coincident with the fixed measuring plane defined by the upper clamping point 11 of the spring bars 2. In order to compensate for this, a voltage proportional to the distace of plane $E_2$ from the clamping point 11 is tapped from the output of one of the transducers and added to the output of the other, thereby eliminating the effect of the additional moment resulting from the distance of the plane $E_2$ from the clamping point 11.

The spring bars in the arrangement of FIGS. 3 and 4 are preferably of uniform cross-section throughout their length. The coupling point of the upper transducer 7 is therefore located midway between the spring clamping points 10 and 11, whereas the coupling point of the lower transducer 8 is located at one third of the effective spring length from the machine base.

Although the invention has been described with reference to specific example embodiments, it is to be understood, that it is intended to cover all modifications and equivalents within the scope of the appended claims.

What is claimed is:

1. An apparatus for the subcritical mass balancing of a rotatable test piece in at least two planes normal to the axis of rotation of the test piece, said apparatus comprising bearing assembly means for rotatably supporting said test piece, means for flexibly supporting said bearing assembly means comprising spring means extending in parallel or coaxially to said axis of rotation, one of the ends of said spring means being clamped with respect to said bearing assembly means and the other end of said spring means being clamped to a fixed point, arm means rigidly mounted with respect to said bearing assembly means, said arm means extending in parallel to said axis of rotation, and first and second sensor-transducer means coupled to said arm means for sensing movement thereof, said first sensor-transducer means being coupled to said arm means at a first point corresponding to the intersection of the tangents to the moment unbalance bending line of said spring means at the ends of the spring means, said second sensor-transducer means being coupled to said arm means at a second point spaced from said first point.

2. The apparatus of claim 1, wherein said spring means has a uniform cross section throughout its length, whereby said first point corresponds to the midpoint of said spring means.

3. The apparatus of claim 1, wherein said second point on said arm means corresponds to the intersection of the tangents at the ends of said spring means to the bending line of the spring means resulting from force unbalance of the test piece in a plane normal to said axis of rotation and in the axial center of the test piece.

4. The apparatus of claim 3, wherein said spring means has a uniform cross section throughout its length, whereby said second point is at a position one third of the effective length of said spring means from said other end of said spring means.

5. The apparatus of claim 1, wherein said two planes are displaced from a predetermined plane parallel thereto, comprising means for adding compensatory voltages to the outputs of said first and second sensor-transducers, the compensatory voltage being a function of the distance between one of said two planes and said predetermined plane.

6. The apparatus of claim 5, wherein said means for adding voltages comprises means for deriving said voltages from the output of one of the sensor transducers.

7. The apparatus of claim 1, wherein said sensor-transducers and said axis of rotation are in a common plane, and said spring means is flexible for movement parallel to said common plane and inflexible for movement in a plane normal thereto and including said axis.

8. The apparatus of claim 7, wherein said spring means comprises a leaf spring.

9. The apparatus of claim 7, wherein said spring means comprises a plurality of parallel leaf springs.

10. The apparatus of claim 7, wherein said spring means is comprised of a pair of parallel flexible bars positioned in a plane coplanar with said axis of rotation and normal to said common plane.

11. The apparatus of claim 1, wherein said spring means comprises a tube, and said bearing assembly is mounted within said tube.

* * * * *